US012035081B1

(12) United States Patent
Shen et al.

(10) Patent No.: US 12,035,081 B1
(45) Date of Patent: Jul. 9, 2024

(54) ROUTE AND WAVELENGTH ASSIGNMENT METHOD AND DEVICE BASED ON ALL-OPTICAL WAVELENGTH CONVERSION

(71) Applicant: SOOCHOW UNIVERSITY, Suzhou (CN)

(72) Inventors: Gangxiang Shen, Suzhou (CN); Xinxin Bu, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 0 days.

(21) Appl. No.: 17/912,253

(22) PCT Filed: Sep. 24, 2021

(86) PCT No.: PCT/CN2021/120148
§ 371 (c)(1),
(2) Date: Sep. 16, 2022

(87) PCT Pub. No.: WO2023/029127
PCT Pub. Date: Mar. 9, 2023

(30) Foreign Application Priority Data

Sep. 2, 2021 (CN) .......................... 202111027199.3

(51) Int. Cl.
*H04Q 11/00* (2006.01)
*H04B 10/50* (2013.01)

(52) U.S. Cl.
CPC ....... *H04Q 11/0005* (2013.01); *H04B 10/506* (2013.01); *H04Q 11/0067* (2013.01);
(Continued)

(58) Field of Classification Search
CPC .......... H04Q 11/0005; H04Q 11/0067; H04Q 2011/0011; H04Q 2011/0084; H04Q 2011/0086; H04B 10/506
(Continued)

(56) References Cited

U.S. PATENT DOCUMENTS 7,218,851 B1 * 5/2007 Zang .................... H04J 14/0241
398/58
10,432,342 B1 * 10/2019 Bathula .................. H04L 41/40
(Continued)

FOREIGN PATENT DOCUMENTS

CN 101217827 A 7/2008
CN 107948766 A 4/2018

OTHER PUBLICATIONS

Tanmay De, et al., "An Efficient Heuristic-based Algorithm for Wavelength Converter Placement in All-optical Networks" Proceedings of the 2007 IEEE International Conference on Telecommunications and Malaysia International Conference on Communications, May 14-17, 2007, Penang, Malaysia (May 17, 2007).
(Continued)

*Primary Examiner* — Dalzid E Singh
(74) *Attorney, Agent, or Firm* — SZDC Law PC

(57) ABSTRACT

The present invention provides a route and wavelength assignment method based on all-optical wavelength conversion, including the steps of: introducing an all-optical wavelength converter in the network; placing a corresponding number of all-optical wavelength converters in a network node according to the principle of sparse wavelength converter placement; establishing an optical channel for the service, in which the establishing an optical channel includes the steps of: establishing an OSNR awareness route and wavelength assignment algorithm model that includes transmission loss, ASE noise and OSNR penalty; and calculating the OSNR of various routes by using the OSNR awareness route and wavelength assignment algorithm model and establishing the optical channel using the route with the highest OSNR and accomplishing wavelength assignment. The present invention can reduce the cost of
(Continued)

all-optical wavelength conversion and the impact of the OSNR penalty on the network performance improvement.

10 Claims, 4 Drawing Sheets

(52) U.S. Cl.
CPC ............... *H04Q 2011/0011* (2013.01); *H04Q 2011/0084* (2013.01); *H04Q 2011/0086* (2013.01)

(58) Field of Classification Search
USPC ........................................... 398/204
See application file for complete search history.

(56) References Cited

U.S. PATENT DOCUMENTS

| | | | | |
|---|---|---|---|---|
| 2003/0035166 A1* | 2/2003 | Zhang | ..................... | H04L 45/60 398/58 |
| 2003/0099014 A1* | 5/2003 | Egner | ................. | H04J 14/0241 398/79 |
| 2009/0060512 A1* | 3/2009 | Bernstein | ............ | H04J 14/0246 398/79 |
| 2012/0213516 A1* | 8/2012 | Mukherjee | .......... | H04J 14/0267 398/45 |
| 2017/0134089 A1* | 5/2017 | Mansouri Rad | .... | H04J 14/0271 |

OTHER PUBLICATIONS

Gangxiang Shen, et al. "Impairment-Aware Lightpath Routing and Regenerator Placement in Optical Transport Networks With Physical-Layer Heterogeneity" Journal of Lightwave Technology, vol. 29, No. 18, pp. 2853-2860 (Sep. 15, 2011).

Wu Tao, et al., "The optimal placement of sparse wavelength converters in WDM networks based on genetics algorithms" J. Huazhong Univ. of Sic. & Tech., vol. 29, No. 8, pp. 10-11, 14 (Aug. 31, 2001).

Ling Ji, "Placement of wavelength converter in wavelength-routed all-optical networks using ant colony system" Computer Simulation, vol. 27, No. 1, pp. 202-205, 270 (Jan. 31, 2010).

* cited by examiner (b)

ROUTE AND WAVELENGTH ASSIGNMENT METHOD AND DEVICE BASED ON ALL-OPTICAL WAVELENGTH CONVERSION

This application is the National Stage Application of PCT/CN2021/120148, filed on Sep. 24, 2021, which claims priority to Chinese Patent Application No. 202111027199.3, filed on Sep. 2, 2021, which is incorporated by reference for all purposes as if fully set forth herein.

FIELD OF THE INVENTION

The present invention relates to the technical field of communication, and more particularly to a route and wavelength assignment method and device based on all-optical wavelength conversion.

DESCRIPTION OF THE RELATED ART

With the rise and development of emerging telecom services such as big data and cloud computing, the global traffic is exploding, which puts higher demand on the capacity of transmission network. Decades ago, wavelength conversion (WC) can flexibly assign wavelength resources and improve network capacity efficiency, so it has received wide attention. WC is classified into optical-electrical-optical (OEO) wavelength conversion and all-optical wavelength conversion (AOWC). OEO conversion is more mature and widely used in optical networks. However, with the increase of optical channel rate, the cost of OEO conversion becomes very high. On the other hand, AOWC is transparent to the optical channel rate and supports seamless conversion in high-speed optical channels, but it has not been widely used in real networks because of its unstable conversion performance. Therefore, in order to meet the requirements of increasing optical channel rate, AOWC with transparency to rate has attracted more and more attention.

Thanks to the development of all-optical signal processing technology in recent years, the performance of AOWC is greatly improved, and the cost is controllable, which inspires researchers to recur to AOWC technology in current and future optical networks. However, most of the researches on AOWC now assume that the conversion will not introduce any optical signal noise, which is just an assumed ideal situation. However, in the actual scene, this is unrealistic, unreasonable and imprecise. Affected by the phase noise transfer and nonlinear effect, AOWC does introduce signal penalty, resulting in the decrease of optical signal-to-noise ratio (OSNR), which is unfavorable for high-speed optical channel signal transmission.

SUMMARY OF THE INVENTION

It is an object of the present invention to provide a route and wavelength assignment method and device based on all-optical wavelength conversion that reduces the cost of all-optical wavelength conversion and mitigates impact of OSNR penalty on network performance improvement.

To address the technical problem mentioned above, the present invention provides a route and wavelength assignment method based on all-optical wavelength conversion, including the steps of:
S1: introducing an all-optical wavelength converter in the network;
S2: placing a corresponding number of all-optical wavelength converters in a network node according to the principle of sparse wavelength converter placement;
S3: establishing an optical channel for the service, in which the establishing an optical channel includes the steps of:
S31: establishing an OSNR awareness route and wavelength assignment algorithm model that includes transmission loss, ASE noise and OSNR penalty; and
S32: calculating the OSNR of various routes by using the OSNR awareness route and wavelength assignment algorithm model and establishing the optical channel using the route with the highest OSNR and accomplishing wavelength assignment.

As a further improvement of the present invention, the placing the all-optical wavelength converters according to the principle of sparse wavelength converter placement in the step S2 includes optimal placement of the shortest route traversal number, optimal placement of the maximum hop count and optimal placement the block cause.

As a further improvement of the present invention, optimal placement of the shortest route traversal number specifically includes the steps of:
calculating the total number of traversals through each network node by the fixed shortest route and defining it as $V_s$, where s is the sequence number of the node; and
placing the number $C_s$ of all-optical wavelength converters in each network node by using the formula $$C_s = \frac{v_s}{\sum_{s \in N} v_s} \cdot T,$$

where T is the total number of wavelength converters in the whole network and N is the set of network nodes.

As a further improvement of the present invention, optimal placement of the maximum hop count specifically includes the steps of:
comparing the maximum hop count in the fixed shortest route through the network nodes with each other and defining the maximum hop count as $V_s$; and
placing the number $C_s$ of all-optical wavelength converters in each network node by using the formula $$C_s = \frac{v_s}{\sum_{s \in N} v_s} \cdot T,$$

where T is the total number of wavelength converters in the whole network and N is the set of network nodes, and placing the converters on the node with the greater maximum hop count.

As a further improvement of the present invention, optimal placement the block cause specifically includes the steps of:
finding the blocked service according to the current resource state of the network;
assuming that all the nodes in the network have full wavelength conversion capability, finding an available route for each blocked service by using the adaptive shortest route algorithm, if an available route is found, checking the wavelength state on all the links in this route, and determining in which node the wavelength converters are to be placed so that this route is successfully established; and based on this, calculating the total number of all-optical wavelength converters needed for each node and defining it as $V_s$, and placing the number $C_s$ of all-optical wavelength converters in each network node by using the formula $$C_s = \frac{v_s}{\sum_{s \in N} v_s} \cdot T,$$

where T is total number of wavelength converters in the whole network, N is the set of network nodes, and the greater $V_s$ a node has, the more it needs wavelength conversion.

As a further improvement of the present invention, the OSNR awareness route and wavelength assignment algorithm model is $$OSNR = OSNR_{total} + \sum_{j=1}^{m} OSNR_{penalty}^{j} = \quad (1)$$

$$10 \lg \frac{1}{\sum_{i=1}^{n} P_{ASE}^{i}} + \sum_{j=1}^{m} 10 \lg \frac{1}{\alpha^j} = 10 \lg \frac{1}{\sum_{i=1}^{n} P_{ASE}^{i} * \prod_{j=1}^{m} \alpha^j},$$

where $OSNR_{total}$ represents the initial OSNR of the optical path and $P_{ASE}^{i}$ represents the ASE noise power of the $i^{th}$ optical amplifier;

$OSNR_{penalty}^{j}$ represents the OSNR penalty of the $j^{th}$ all-optical wavelength converter and is specifically calculated as $OSNR_{penalty}=OSNR_{WC}-OSNR_{NWC}=10\lg(P_{NWC}/P_{WC})$, where $OSNR_{WC}$ represents the OSNR with a wavelength conversion system and $OSNR_{NWC}$ represents the OSNR without any wavelength conversion system, $P_{WC}$ and $P_{NWC}$ represent noise power with and without a wavelength conversion system, with $P_{NWC}/P_{WC}$ being represented by $\alpha$ in the formula (1), and $\alpha^j$ is the $P_{NWC}/P_{WC}$ of the $j^{th}$ all-optical wavelength converter.

As a further improvement of the present invention, the calculating the OSNR of various routes by using the OSNR awareness route and wavelength assignment algorithm model in the step S32 specifically includes the steps of:

S321: calculating $P_{ASE}^{i}$ by using the following formulas:

$$P_{ASE}^{i} \text{ (dBm)} = -58 \text{ (dBm)} + G \text{ (dB)} + NF_G \text{ (dB)} \quad (2) \text{ and}$$

$$P_{ASE}^{i} \text{ (mW)} = 10^{P_{ASE}^{i}(dmB)/10} \quad (3)$$

where G is the gain of the $i^{th}$ optical amplifier, and NF is the noise corresponding to G;

S322: obtaining the $OSNR_s$ without considering the OSNR penalty:

$$OSNR_s = P_{out}/P_{Ase} = 1/P_{Ase} \text{ (mw)} \quad (4)$$

where $P_{out}$ is the transmit power of the optical amplifier;

S323: obtaining the corresponding modulation format according to the comparison between the obtained $OSNR_s$ and the corresponding OSNR threshold, determining the corresponding OSNR penalty according to the modulation format, and deriving $\alpha^j$ from $OSNR_{penalty}=OSNR_{WC}-OSNR_{NWC}=10\lg(P_{NWC}/P_{WC})$;

S324: setting the cost of each link and each wavelength conversion node to $P_{ASE}^{i}$ and $\alpha^j$ and substituting them into the formula (1) for calculation to obtain the corresponding OSNR; and S325: comparing the OSNR of the links with each other and selecting the route with the highest OSNR for establishment of the optical channel.

A wavelength assignment device based on all-optical wavelength conversion includes:

a deployment unit configured to place a corresponding number of all-optical wavelength converters in a network node according to the principle of sparse wavelength converter placement; and computation units configured to establish an optical channel for the service, including a first computation unit and a second computation unit, in which the first computation unit is configured to establish an OSNR awareness route and wavelength assignment algorithm model that includes transmission loss, ASE noise and OSNR penalty; and the second computation unit is configured to calculate the OSNR of various routes by using the OSNR awareness route and wavelength assignment algorithm model and establish the optical channel using the route with the highest OSNR and accomplish wavelength assignment.

As a further improvement of the present invention, the deployment unit places the number $C_s$ of all-optical wavelength converters in each network node by using the formula $$C_s = \frac{v_s}{\sum_{s \in N} v_s} \cdot T,$$

where T is total number of wavelength converters in the whole network, N is the set of network nodes, and $V_s$ is the total number of wavelength converters needed by each node.

As a further improvement of the present invention, the OSNR awareness route and wavelength assignment algorithm model is:

$$OSNR = OSNR_{total} + \sum_{j=1}^{m} OSNR_{penalty}^{j} = \quad (1)$$

$$10 \lg \frac{1}{\sum_{i=1}^{n} P_{ASE}^{i}} + \sum_{j=1}^{m} 10 \lg \frac{1}{\alpha^j} = 10 \lg \frac{1}{\sum_{i=1}^{n} P_{ASE}^{i} * \prod_{j=1}^{m} \alpha^j},$$

where $OSNR_{total}$ represents the initial OSNR of the optical path and $P_{ASE}^{i}$ represents the ASE noise power of the $i^{th}$ optical amplifier;

$OSNR_{penalty}^{j}$ represents the OSNR penalty of the $j^{th}$ all-optical wavelength converter and is specifically calculated as $OSNR_{penalty}=OSNR_{WC}-OSNR_{NWC}=10\lg(P_{NWC}/P_{WC})$, where $OSNR_{WC}$ represents the OSNR with a wavelength conversion system and $OSNR_{NWC}$ represents the OSNR without any wavelength conversion system, $P_{WC}$ and $P_{NWC}$ represent noise power with and without a wavelength conversion system, with $P_{NWC}/P_{WC}$ being represented by $\alpha$ in the formula (1), and $\alpha^j$ is the $P_{NWC}/P_{WC}$ of the $j^{th}$ all-optical wavelength converter.

Beneficial effects of the present invention: in the present invention, after AOWC is introduced, the route with the highest OSNR is selected for establishment of the optical channel in consideration of the signal penalty of AOWC, and impact of signal penalty on network performance improvement is reduced to the greatest extent while network resource assignment flexibility brought about by AOWC is ensured; meanwhile, the cost and penalty of AOWC are further reduced through sparse wavelength converter deployment.

DETAILED DESCRIPTION OF THE PREFERRED EMBODIMENTS

The invention will be further explained with reference to the following drawings and particular embodiments, so that those skilled in the art can better understand the present invention and implement it. However, the cited embodiments should not be taken as limitation of the present invention.

Figure 1:
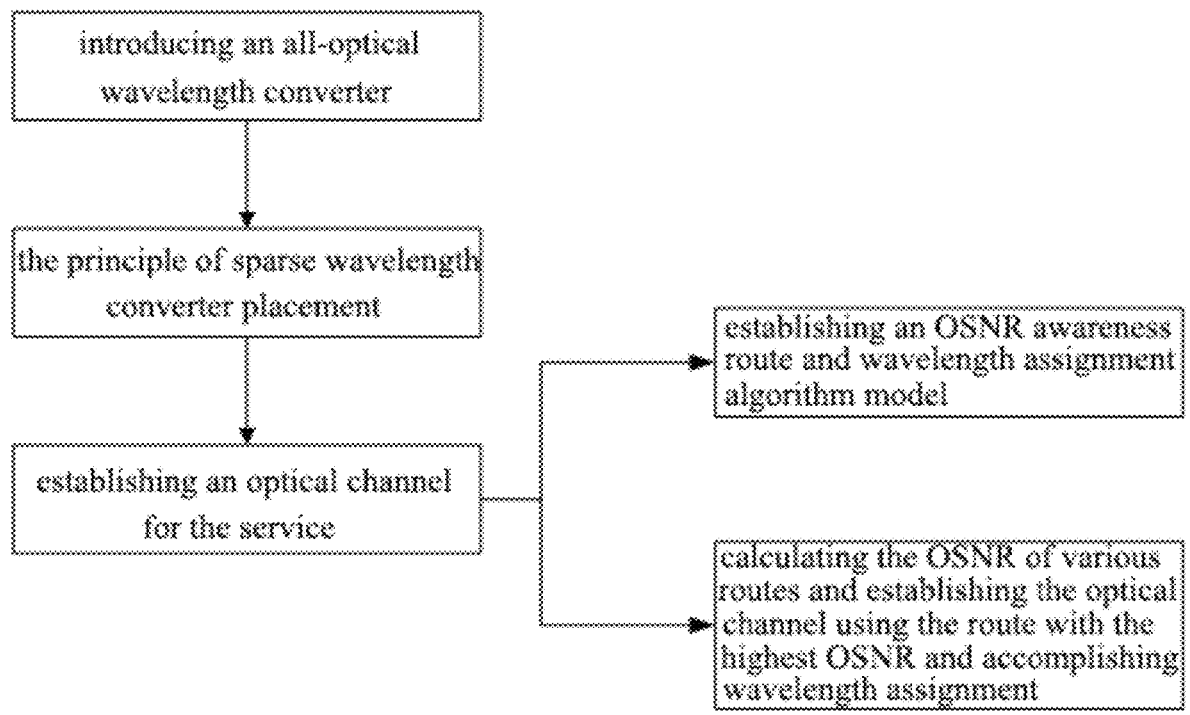
FIG. 1 is a schematic flow diagram of a method according to the present invention.

Referring to FIG. 1, an embodiment of the present invention provides a route and wavelength assignment method based on all-optical wavelength conversion, including the steps of:

S1: introducing an all-optical wavelength converter in the network;

S2: placing a corresponding number of all-optical wavelength converters in a network node according to the principle of sparse wavelength converter placement;

S3: establishing an optical channel for the service, in which the establishing an optical channel includes the steps of:

S31: establishing an OSNR awareness route and wavelength assignment algorithm model that includes transmission loss, ASE noise and OSNR penalty; and S32: calculating the OSNR of various routes by using the OSNR awareness route and wavelength assignment algorithm model and establishing the optical channel using the route with the highest OSNR and accomplishing wavelength assignment.

Specifically, the placing a corresponding number of all-optical wavelength converters in a network node according to the principle of sparse wavelength converter placement includes placing the number $C_s$ of all-optical wavelength converters in each network node by using the formula $$C_s = \frac{v_s}{\sum_{s \in N} v_s} \cdot T,$$

where T is total number of wavelength converters in the whole network, N is the set of network nodes, and $V_s$ is the total number of wavelength converters needed by each node and can be defined here depending on the specific deployment conditions and requirements. Three modes of deployment are made as follows:

(1) Shortest route traversal number priority (SRT): first, the total number of traversals through each node by the fixed shortest route is calculated and defined as $V_s$, where s is the sequence number of the node. Then, a certain number of wavelength converters are placed in each node by using the formula $$C_s = \frac{v_s}{\sum_{s \in N} v_s} \cdot T,$$

where T is the total number of wavelength converters in the whole network and N is the set of network nodes. The route traversal number represents how busy a node is. Placing converters in the busiest node can mitigate wavelength contention to the greatest extent and consequently improve blocking performance of the optical path.

(2) Maximum hop count priority (MH): first the maximum hop count in the fixed shortest route through the nodes is compared with each other and the maximum hop count is defined as $V_s$; then the number of wavelength converters to be placed in each node is calculated by using the same formula as in the SRT strategy. Better performance can be achieved by placing more converters on the node with the greater maximum hop count.

(3) Block cause priority (BC): unlike the two strategies based on a fixed route as described above, this strategy is based on a wave plane algorithm. First, a blocked service is found according to the current resource state of the network. Then, assuming that all the nodes in the network have full wavelength conversion capability, an available route is found for each blocked service by using the adaptive shortest route algorithm. If an available route is found, the wavelength state on all the links in this route is checked, and it is determined in which node the wavelength converters are to be placed so that this route is successfully established. On this basis, the total number of wavelength converters needed by each node is calculated and defined as $V_s$. Then the number of converters that should be placed in each node is calculated based on the same formula as in the SRT strategy. The greater a node has, the more it needs wavelength conversion.

In establishing the optical channel, the OSNR awareness route and wavelength assignment algorithm model is specifically:

$$OSNR = OSNR_{total} + \sum_{j=1}^{m} OSNR_{penalty}^{j} = \qquad (1)$$

$$10 \lg \frac{1}{\sum_{i=1}^{n} P_{ASE}^{i}} + \sum_{j=1}^{m} 10 \lg \frac{1}{\alpha^{j}} = 10 \lg \frac{1}{\sum_{i=1}^{n} P_{ASE}^{i} * \Pi_{j=1}^{m} \alpha^{j}},$$

where $OSNR_{total}$ represents the initial OSNR of the optical path and $P_{ASE}^{i}$ represents the ASE noise power of the $i^{th}$ optical amplifier;

$OSNR_{penalty}^{j}$ represents the OSNR penalty of the $j^{th}$ all-optical wavelength converter and is specifically calculated as $OSNR_{penalty}=OSNR_{WC}-OSNR_{NWC}=10lg(P_{NWC}/P_{WC})$, where $OSNR_{WC}$ represents the OSNR with a wavelength conversion system and $OSNR_{NWC}$ represents the OSNR without any wavelength conversion system, $P_{WC}$ and $P_{NWC}$ represent noise power with and without a wavelength conversion system, with $P_{NWC}/P_{WC}$ being represented by $\alpha$ in the formula (1), and $\alpha^j$ is the $P_{NWC}/P_{WC}$ of the $j^{th}$ all-optical wavelength converter; and comparing the OSNR of the links with each other and selecting the route with the highest OSNR to establish the optical channel.

The present invention has considered the trade-off between signal penalty and network performance improvement with AOWC and proposes an optical path OSNR awareness route and wavelength assignment algorithm (RWA). Specifically, by selecting the route with the highest OSNR to establish the optical channel considering signal penalty with AOWC, impact of signal penalty on network performance improvement is reduced to the greatest extent, while network resource assignment flexibility brought about by AOWC is ensured. Also, to further reduce the AOWC cost, we studied the impact of sparse wavelength conversion on network performance.

An embodiment of the present invention further provides a wavelength assignment device based on all-optical wavelength conversion, including:

a deployment unit configured to place a corresponding number of all-optical wavelength converters in a network node according to the principle of sparse wavelength converter placement; and computation units configured to establish an optical channel for the service, including a first computation unit and a second computation unit, in which the first computation unit is configured to establish an OSNR awareness route and wavelength assignment algorithm model that includes transmission loss, ASE noise and OSNR penalty; and the second computation unit is configured to calculate the OSNR of various routes by using the OSNR awareness route and wavelength assignment algorithm model and establish the optical channel using the route with the highest OSNR and accomplish wavelength assignment.

The principle is the same as the method described above and shall not be described again.

First Embodiment

To establish the optical channel, first the OSNR S of the optical path is calculated by using the formulas (2), (3) and (4):

$$P_{ASE}^i \text{ (dBm)}=-58 \text{ (dBm)}+G \text{ (dB)}+NF_G \text{ (dB)} \quad (2)$$

$$P_{ASE}^i \text{ (mW)}=10^{P_{ASE}^i(dmB)/10} \quad (3)$$

$$OSNR_s=P_{out}/P_{Ase}=1/P_{Ase}\text{(mw)} \quad (4)$$

where G is the gain of the $i^{th}$ optical amplifier, and NF is the noise corresponding to G and $P_{out}$ is the transmit power of the optical amplifier.

The $OSNR_s$ has taken into account the optic fiber transmission loss and amplifier spontaneous emission (ASE) noise but not the OSNR penalty. To calculate the OSNR penalty introduced by AOWC, a corresponding modulation format is obtained based on comparison between the obtained $OSNR_s$ and the corresponding OSNR threshold. The corresponding OSNR penalty is determined based on the modulation format. Then, $\alpha^j$ is obtained from $OSNR_{penalty}=OSNR_{WC}-OSNR_{NWC}=10lg(P_{NWC}/P_{WC})$, as shown in Table 1:

TABLE 1

| Modulation | OSNR | ThresholdOSNR Penalty (dB) |
|---|---|---|
| QPSK | 12 | −0.5 |
| 8QAM | 16 | −0.625 |
| 16QAM | 18.6 | −0.75 |
| 32QAM | 21.6 | −0.875 |
| 64QAM | 24.6 | −1 |

The cost of each link and each wavelength conversion node is set to $P_{ASE}^i$ and $\alpha^j$, which are substituted into the formula (1) for calculation to obtain the corresponding OSNR.

The OSNR of the links is compared with each other, and the route with the highest OSNR is selected to establish the optical channel.

Figure 2:
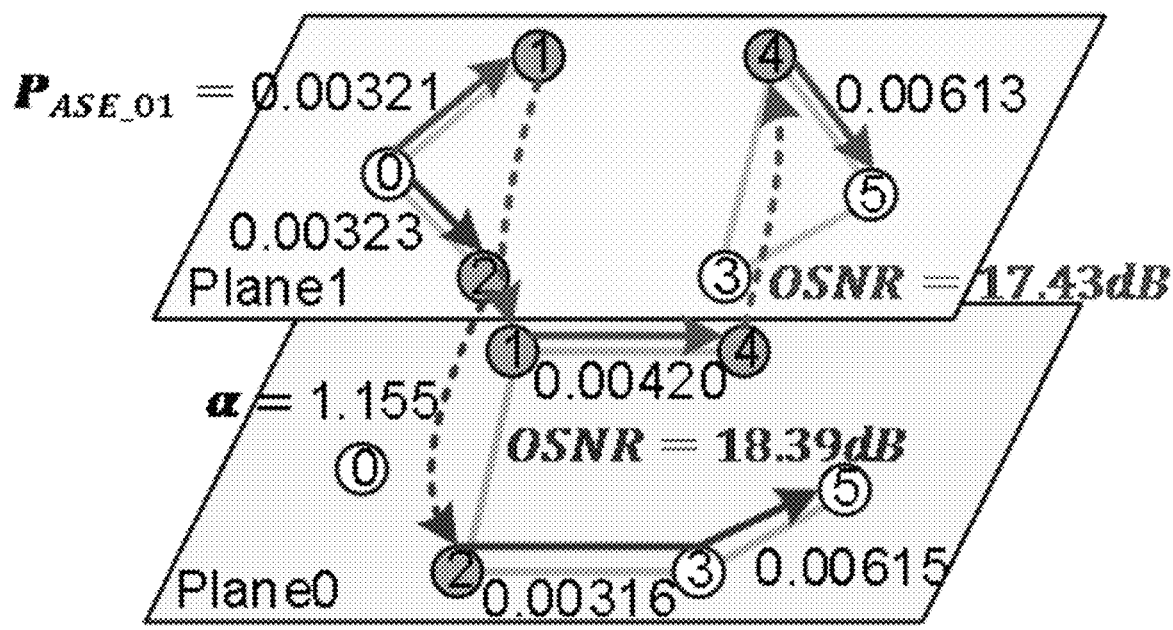
FIG. 2 is a schematic view of cost setting in a wave plane topology according to a first embodiment of the present invention.

As shown in FIG. 2, for the node pair (0-5) and the cost setting in the wave plane topology, the OSNR of the routes (0-2-3-5) and (0-1-4-5) is calculated respectively as 18.39 dB and 17.43 dB. Therefore, for the node pair (0-5), the optical channel is established on the route (0-2-3-5) because it has higher OSNR.

Second Embodiment

Figure 3:
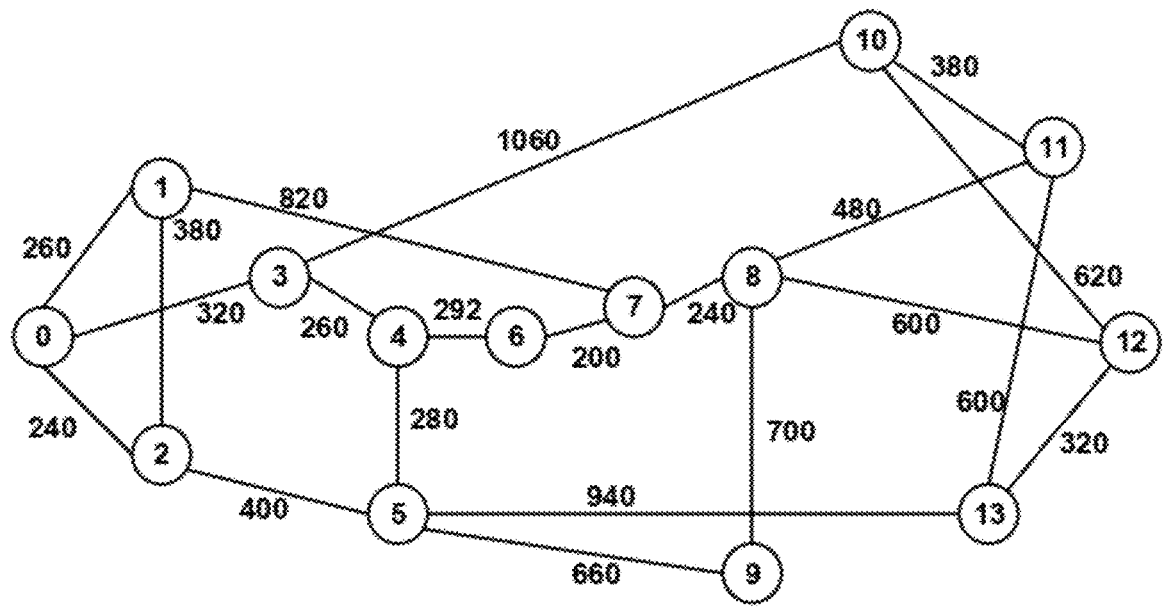
FIG. 3 is a schematic view of a test network NSFNET utilized in a second embodiment of the present invention.
Figure 4:
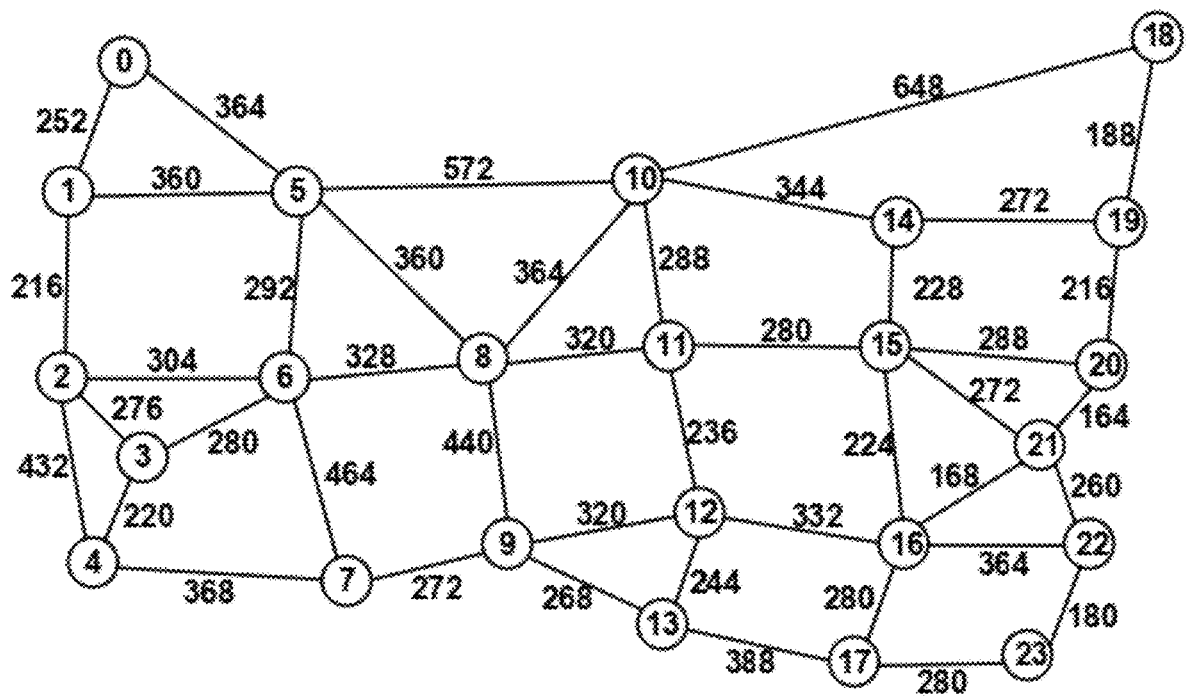
FIG. 4 is a schematic view of a test network USNET utilized in a second embodiment of the present invention.

To evaluate performance of the present invention, a NSFNET network including 14 nodes and 21 links and a USNET network including 24 nodes and 43 links are used as the test networks, as shown in FIGS. 3 and 4. Without exception, the number of wavelengths on each optic fibre link in both networks in the present invention is set to 16. It is noted, in a 50 GHz wavelength division multiplexing (WDM) network, the number of wavelengths on each optic fibre link in C waveband can be up to 80. However, with the popularization of hyper channels (e.g. 400 Gb/s and 800 Gb/s) in future optical networks, the number of wavelengths in each optic fibre link can be much lower, 16 for example. Besides, the load in the optical path is in the unit of Erlang, in which case the arrival of optical path requests follows Poisson distribution and the duration of each established optical path follows negative exponent distribution. Given the assumed load, the same applies to all the nodes. Table 2 shows the number of converters placed on the wavelength conversion node with the three strategies. In this case, 20 wavelength converters are placed on six nodes in the NSFNET network and 25 wavelength converters are placed on five nodes in the USNET network.

TABLE 2

| NSFNET | | |
|---|---|---|
| BC | SRT | MH |
| N0: 1 N3: 1 N4: 7 N5: 2 N7: 6 N8: 3 | N1: 2 N4: 3 N5: 5 N6: 2 N7: 3 N8: 5 | N3: 2 N4: 4 N5: 4 N6: 2 N7: 4 N8: 4 |
| USNET | | |
| BC | SRT | MH |
| N5: 4 N6: 3 N8: 9 N9: 4 N10: 5 | N8: 7 N9: 4 N11: 5 N15: 5 N21: 4 | N5: 5 N6: 5 N8: 5 N15: 5 N16: 5 |

Figure 5:
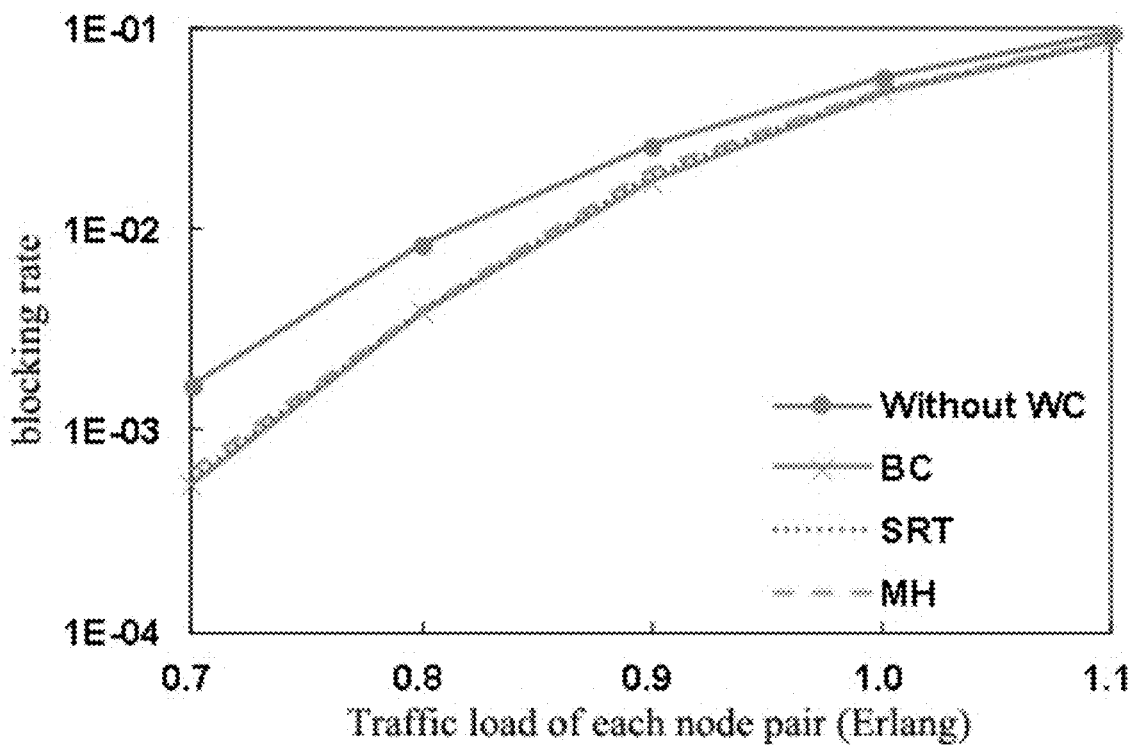
FIG. 5 is a simulation diagram of optical path blocking performance in the network NSFNET for a converter placement scheme according to the present invention.
Figure 6:
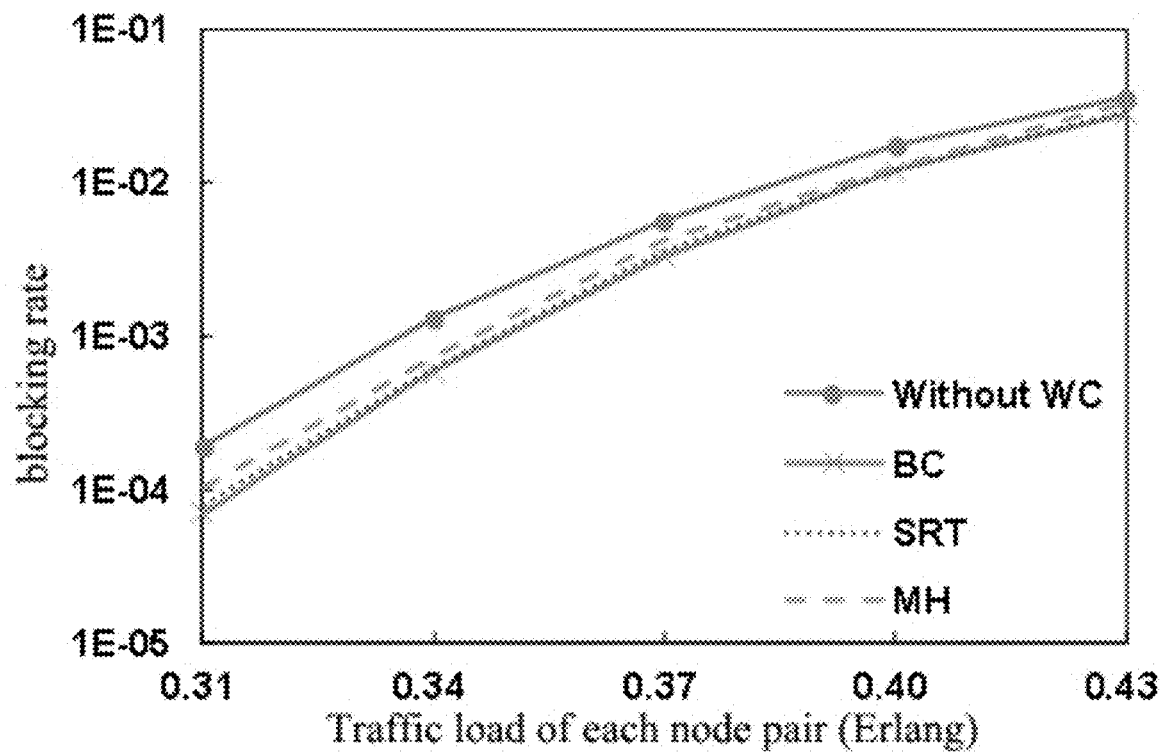
FIG. 6 is a simulation diagram of optical path blocking performance in the network USNET for a converter placement scheme according to the present invention.

According to the converter placement situations in Table 2, the optical path blocking performance is compared between different schemes, three placement strategies and the case without WC, in FIGS. 5 and 6. These schemes are represented in the legend respectively as "BC", "SRT", "MH" and "without WC". As can be seen, the three strategies can significantly improve the optical path blocking performance compared with the case without WC. Among them, the BC strategy provides the best performance, since it has taken into account real-time network resource use state to determine the critical node that needs WC, whereas the SRT and MH strategies assign converters according to the static fixed route between a pair of nodes.

Figure 7:
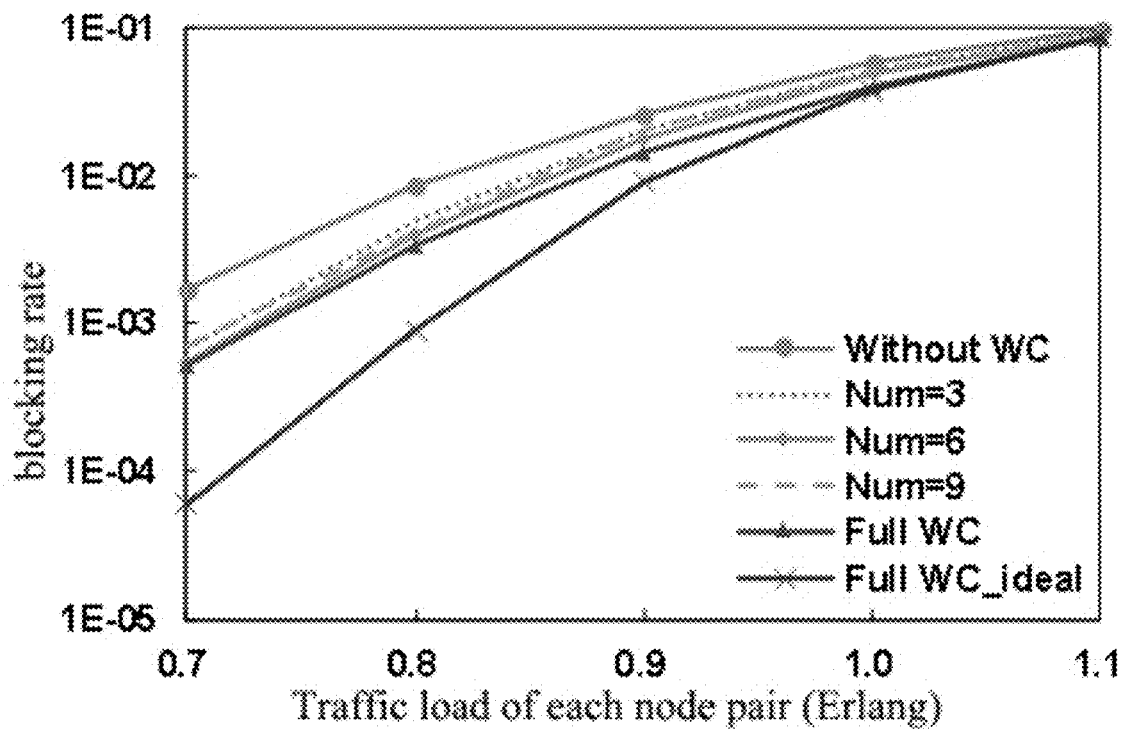
FIG. 7 shows the optical path blocking performance in the case of different numbers of wavelength conversion nodes in NSFNET according to the present invention.
Figure 8:
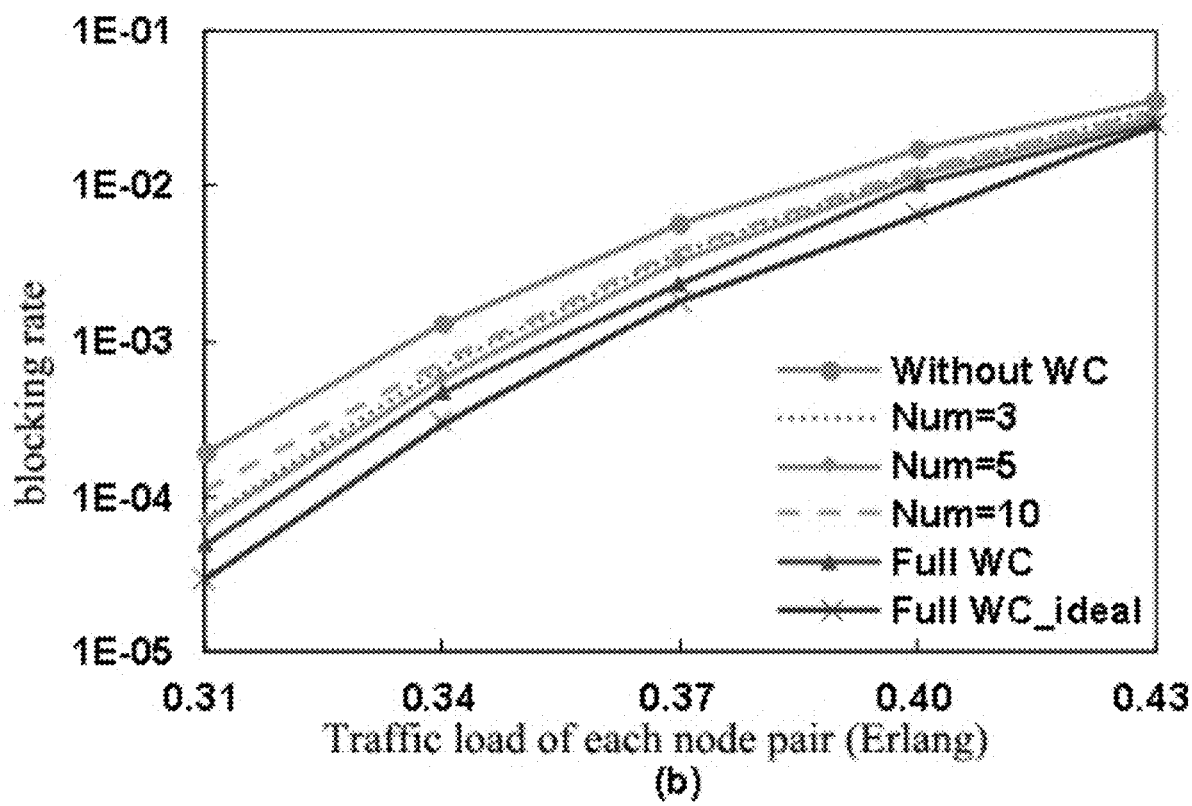
FIG. 8 shows the optical path blocking performance in the case of different numbers of wavelength conversion nodes in USNET according to the present invention.

FIGS. 7 and 8 evaluate how different numbers of wavelength conversion nodes impact optical path blocking performance in the network. In this embodiment, we only consider the "BC" strategy, because it has more superior performance. As described above, 20 and 25 converters are placed respectively in NSFNET and USNET and distributed sparsely in various wavelength conversion nodes. In the legend, "Num=x" represents the number of convertible nodes in the network, and "Full WC" and "Full WC_ideal" represent the full wavelength conversion capability of all the nodes in the network. "Full WC_ideal" assumes that AOWC will not introduce any signal penalty. As can be seen, at the beginning the optical path blocking rate decreases as the number of wavelength conversion nodes increases; however, when the number of wavelength conversion nodes reaches a certain threshold, further increase of the number of wavelength conversion nodes will cause increase of the blocking rate (e.g., Num=5 and Num=10 in FIG. 8). This is because when there are too many wavelength conversion nodes, some converters may be wastefully distributed on "unimportant" nodes, which causes degradation of network blocking performance. Also, when the ratio of the number of wavelength conversion nodes to the total number of nodes in the network reaches a certain threshold, e.g., 20%-40%, sparse WC can nearly reach the performance of full WC, which indicates that sparse WC can achieve efficient optical path blocking performance at a lower network cost. At last, the case considering AOWC signal penalty is compared with the case without considering AOWC signal penalty, i.e. "Full WC" vs "Full WC_ideal", and it is noted that AOWC signal penalty significantly degrades the optical path blocking performance, which proves that AOWC signal penalty has to be reduced through the conversion technique, and that wavelength converters should be sparsely placed to reduce AOWC deployment as much as possible.

The embodiments described above are only preferred embodiments for fully explaining the present invention, and the scope of protection of the present invention is not limited thereto. Equivalent substitutions or changes made by those skilled in the art on the basis of the present invention shall fall within the scope of protection of the present invention. The scope of protection of the present invention shall be defined by the claims.

What is claimed is:

1. A route and wavelength assignment method based on all-optical wavelength conversion, comprising steps of:
S1: introducing an all-optical wavelength converter in a network;
S2: placing a corresponding number of all-optical wavelength converters in a network node according to the principle of sparse wavelength converter placement;
S3: establishing an optical channel for a service, wherein the establishing an optical channel includes steps of:
S31: establishing an OSNR awareness route and wavelength assignment algorithm model that includes transmission loss, ASE noise and OSNR penalty; and
S32: calculating the OSNR of various routes by using the OSNR awareness route and wavelength assignment algorithm model and establishing the optical channel using the route with the highest OSNR and accomplishing wavelength assignment.

2. The route and wavelength assignment method based on all-optical wavelength conversion of claim 1, wherein the placing the all-optical wavelength converters according to the principle of sparse wavelength converter placement in the step S2 includes optimal placement of the shortest route traversal number, optimal placement of the maximum hop count and optimal placement of block cause.

3. The route and wavelength assignment method based on all-optical wavelength conversion of claim 2, wherein optimal placement of the shortest route traversal number includes steps of:
calculating the total number of traversals through each network node by the fixed shortest route and defining it as $V_s$, where s is a sequence number of the node; and
placing the number $C_s$ of all-optical wavelength converters in each network node by using the formula $$C_s = \frac{v_s}{\sum_{s \in N} v_s} \cdot T,$$

where T is the total number of wavelength converters in the whole network and N is a set of network nodes.

4. The route and wavelength assignment method based on all-optical wavelength conversion of claim 2, wherein the optimal placement of the maximum hop count includes steps of:
comparing the maximum hop count in the fixed shortest route through the network nodes with each other and defining the maximum hop count as $V_s$; and
placing the number $C_s$ of all-optical wavelength converters in each network node by using the formula $$C_s = \frac{v_s}{\sum_{s \in N} v_s} \cdot T,$$

where T is the total number of wavelength converters in the whole network and N is a set of network nodes, and placing the converters on the node with the greater maximum hop count.

5. The route and wavelength assignment method based on all-optical wavelength conversion of claim 2, wherein the optimal placement block cause specifically includes steps of:
finding a blocked service according to a current resource state of the network;
assuming that all the nodes in the network have full wavelength conversion capability, finding an available route for each blocked service by using the adaptive shortest route algorithm, if an available route is found, checking the wavelength state on all the links in this route, and determining in which node the wavelength converters are to be placed so that this route is successfully established; and
based on this, calculating the total number of all-optical wavelength converters needed for each node and defining it as $V_s$, and placing the number $C_s$ of all-optical wavelength converters in each network node by using the formula $$C_s = \frac{v_s}{\sum_{s \in N} v_s} \cdot T,$$

where T is total number of wavelength converters in the whole network, N is the set of network nodes, and the greater $V_s$ a node has, the more it needs wavelength conversion.

6. The route and wavelength assignment method based on all-optical wavelength conversion of claim 1, wherein the OSNR awareness route and wavelength assignment algorithm model is $$OSNR = OSNR_{total} + \sum_{j=1}^{m} OSNR_{penalty}^{j} = \qquad (1)$$
$$10 \lg \frac{1}{\sum_{i=1}^{n} P_{ASE}^i} + \sum_{j=1}^{m} 10 \lg \frac{1}{\alpha^j} = 10 \lg \frac{1}{\sum_{i=1}^{n} P_{ASE}^i * \Pi_{j=1}^{m} \alpha^j},$$

where $OSNR_{total}$ represents the initial OSNR of the optical path and $P_{ASE}^i$ represents the ASE noise power of the $i^{th}$ optical amplifier;

$OSNR_{penalty}^j$ represents the OSNR penalty of the $j^{th}$ all-optical wavelength converter and is specifically calculated as $OSNR_{penalty} = OSNR_{WC} - OSNR_{NWC} = 10\lg (P_{NWC}/P_{WC})$, where $OSNR_{WC}$ represents the OSNR with a wavelength conversion system and $OSNR_{NWC}$ represents the OSNR without any wavelength conversion system, $P_{WC}$ and $P_{NWC}$ represent noise power with and without a wavelength conversion system respectively, with $P_{NWC}/P_{WC}$ being represented by $\alpha$ in the formula (1), and $\alpha^j$ being the $P_{NWC}/P_{WC}$ of the $j^{th}$ all-optical wavelength converter.

7. The route and wavelength assignment method based on all-optical wavelength conversion of claim 6, wherein the calculating the OSNR of various routes by using the OSNR awareness route and wavelength assignment algorithm model in the step S32 specifically includes the steps of:

S321: calculating $P_{ASE}^i$ by using formulas of:

$$P_{ASE}^i (dBm) = -58 (dBm) + G (dB) + NF_G (dB) \qquad (2) \text{ and}$$

$$P_{ASE}^i (mW) = 10^{P_{ASE}^i (dmB)/10} \qquad (3)$$

where G is the gain of the $i^{th}$ optical amplifier, and NF is the noise corresponding to G;

S322: obtaining the $OSNR_s$ without considering the OSNR penalty:

$$OSNR_s = P_{out}/P_{Ase} = 1/P_{Ase}(mw) \qquad (4)$$

where $P_{out}$ is the transmit power of the optical amplifier;

S323: obtaining the corresponding modulation format according to the comparison between the obtained $OSNR_s$ and a corresponding OSNR threshold, determining the corresponding OSNR penalty according to the modulation format, and deriving $\alpha^j$ from $OSNR_{penalty} = OSNR_{WC} - OSNR_{NWC} = 10\lg(P_{NWC}/P_{WC})$;

S324: setting costs of each link and each wavelength conversion node to $P_{ASE}^i$ and $\alpha^j$ respectively and substituting them into the formula (1) for calculation to obtain the corresponding OSNR; and S325: comparing the OSNR of the links with each other and selecting the route with the highest OSNR for establishment of the optical channel.

8. A route and wavelength assignment device based on all-optical wavelength conversion, comprising:

a deployment unit configured to place a corresponding number of all-optical wavelength converters in a network node according to the principle of sparse wavelength converter placement; and computation units configured to establish an optical channel for a service, including a first computation unit and a second computation unit, in which the first computation unit is configured to establish an OSNR awareness route and wavelength assignment algorithm model that includes transmission loss, ASE noise and OSNR penalty; and the second computation unit is configured to calculate the OSNR of various routes by using the OSNR awareness route and wavelength assignment algorithm model and establish the optical channel using the route with the highest OSNR and accomplish wavelength assignment.

9. The route and wavelength assignment device based on all-optical wavelength conversion of claim 8, wherein the deployment unit places the number $C_s$ of all-optical wavelength converters in each network node by using the formula $$C_s = \frac{v_s}{\sum_{s \in N} v_s} \cdot T,$$

where T is total number of wavelength converters in the whole network, N is the set of network nodes, and $V_s$ is the total number of wavelength converters needed by each node.

10. The route and wavelength assignment device based on all-optical wavelength conversion of claim 8, wherein the OSNR awareness route and wavelength assignment algorithm model is:

$$OSNR = OSNR_{total} + \sum_{j=1}^{m} OSNR_{penalty}^{j} = \qquad (1)$$
$$10 \lg \frac{1}{\sum_{i=1}^{n} P_{ASE}^i} + \sum_{j=1}^{m} 10 \lg \frac{1}{\alpha^j} = 10 \lg \frac{1}{\sum_{i=1}^{n} P_{ASE}^i * \Pi_{j=1}^{m} \alpha^j},$$

where $OSNR_{total}$ represents an initial OSNR of the optical path and $P_{ASE}^i$ represents the ASE noise power of the $i^{th}$ optical amplifier;

$OSNR_{penalty}^j$ represents the OSNR penalty of the $j^{th}$ all-optical wavelength converter and is specifically calculated as $OSNR_{penalty} = OSNR_{WC} - OSNR_{NWC} = 10\lg (P_{NWC}/P_{WC})$, where $OSNR_{WC}$ represents the OSNR with a wavelength conversion system and $OSNR_{NWC}$ represents the OSNR without any wavelength conversion system, $P_{WC}$ and $P_{NWC}$ represent noise power with and without a wavelength conversion system, with $P_{NWC}/P_{WC}$ being represented by $\alpha$ in the formula (1), and $\alpha^j$ is the $P_{NWC}/P_{WC}$ of the $j^{th}$ all-optical wavelength converter.

\* \* \* \* \*